(12) United States Patent
Jiang

(10) Patent No.: US 11,127,938 B2
(45) Date of Patent: *Sep. 21, 2021

(54) ELECTRODES FOR BATTERIES AND METHODS FOR MAKING SAME

(71) Applicant: Pacesetter, Inc., Sunnyvale, CA (US)

(72) Inventor: Xiaofei Jiang, Clemson, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/225,667

(22) Filed: Dec. 19, 2018

(65) Prior Publication Data

US 2019/0245197 A1 Aug. 8, 2019

Related U.S. Application Data

(60) Provisional application No. 62/627,060, filed on Feb. 6, 2018.

(51) Int. Cl.
| | |
|---|---|
| *H01M 4/08* | (2006.01) |
| *H01M 4/54* | (2006.01) |
| *H01M 4/485* | (2010.01) |
| *H01M 4/587* | (2010.01) |
| *H01M 4/583* | (2010.01) |
| *H01M 4/62* | (2006.01) |
| *H01M 4/66* | (2006.01) |

(Continued)

(52) U.S. Cl.
CPC ............ *H01M 4/08* (2013.01); *H01M 4/043* (2013.01); *H01M 4/0471* (2013.01); *H01M 4/485* (2013.01); *H01M 4/54* (2013.01); *H01M 4/587* (2013.01); *H01M 4/5835* (2013.01); *H01M 4/625* (2013.01); *H01M 4/663* (2013.01); *H01M 4/667* (2013.01); *H01M 2004/028* (2013.01); *H01M 2220/30* (2013.01)

(58) Field of Classification Search
CPC .......... H01M 4/08; H01M 4/54; H01M 4/485; H01M 4/587; H01M 4/5835; H01M 4/623; H01M 4/667; H01M 4/663; H01M 4/0471; H01M 4/043; H01M 4/625; H01M 2004/028; H01M 2220/30; H01M 4/364; H01M 4/06; H01M 6/16; H01M 4/382

See application file for complete search history.

(56) References Cited

U.S. PATENT DOCUMENTS

| | | | |
|---|---|---|---|
| 5,435,874 A | * | 7/1995 | Takeuchi ................ H01M 4/04 156/242 |
| 5,571,640 A | * | 11/1996 | Takeuchi ................ H01M 4/04 429/209 |
| 5,716,729 A | | 2/1998 | Sunderland et al. |

(Continued)

*Primary Examiner* — Kwang Han

(74) *Attorney, Agent, or Firm* — Lerner, David, Littenberg, Krumholz & Mentlik, LLP

(57) ABSTRACT

A method of fabricating a battery electrode includes forming a mixture including an electrode material and a binder; forming an electrode blank from the mixture; heating the electrode blank at a predetermined temperature for a predetermined time to form an annealed electrode blank; and laminating the annealed electrode blank to a current collector. The current collector may include a conductive carbon coating. In such event, the method may further include heating the current collector at a selected temperature for a selected time prior to laminating the annealed electrode blank to the current collector.

13 Claims, 5 Drawing Sheets

(51) Int. Cl.
*H01M 4/04* (2006.01)
*H01M 4/02* (2006.01)

(56) References Cited

U.S. PATENT DOCUMENTS

| | | |
|---|---|---|
| 5,766,797 A | 6/1998 | Crespi et al. |
| 5,811,206 A | 9/1998 | Sunderland et al. |
| 6,017,656 A | 1/2000 | Crespi et al. |
| 6,132,896 A | 10/2000 | Sunderland et al. |
| 6,228,534 B1 | 5/2001 | Takeuchi et al. |
| 6,232,012 B1 | 5/2001 | Howard et al. |
| 6,770,176 B2 | 8/2004 | Benson et al. |
| 8,815,450 B1 | 8/2014 | Bates |
| 9,077,000 B2 | 7/2015 | Liang |
| 2007/0264550 A1 | 11/2007 | Zhang et al. |
| 2011/0179637 A1* | 7/2011 | Eberman ............... H01M 4/582 29/623.5 |
| 2012/0308861 A1* | 12/2012 | Xing ..................... H01M 4/133 429/94 |
| 2013/0164630 A1* | 6/2013 | Ihara ..................... H01M 4/587 429/303 |
| 2014/0099551 A1* | 4/2014 | Han ...................... H01M 4/505 429/223 |
| 2014/0170475 A1* | 6/2014 | Park ..................... H01M 4/625 429/188 |
| 2015/0079473 A1* | 3/2015 | Kang .................... H01M 4/485 429/220 |
| 2016/0013489 A1 | 1/2016 | Chi et al. |
| 2016/0156031 A1* | 6/2016 | Kim ..................... H01M 4/386 429/218.1 |
| 2016/0351897 A1 | 12/2016 | Jiang |
| 2017/0346079 A1* | 11/2017 | Friend .................. H01M 4/387 |
| 2017/0352919 A1* | 12/2017 | Ihara ................... H02J 2207/20 |
| 2018/0083260 A1* | 3/2018 | Jiang ...................... H01M 4/08 |
| 2018/0159172 A1* | 6/2018 | O'Neill ............. H01M 10/0525 |

* cited by examiner

ELECTRODES FOR BATTERIES AND METHODS FOR MAKING SAME

CROSS-REFERENCE TO RELATED APPLICATION

This application claims the benefit of the filing date of U.S. Provisional Application No. 62/627,060, filed Feb. 6, 2018, the disclosure of which is hereby incorporated herein by reference in its entirety.

FIELD OF THE INVENTION

The present disclosure relates generally to batteries and to methods for making same. More particularly, the present disclosure relates to methods for making improved battery electrodes and to batteries incorporating same.

BACKGROUND OF THE INVENTION

Batteries used in Implantable Medical Devices (IMDs), such as cardiac pacemakers and implantable cardioverter defibrillators, are required to meet high quality and performance specifications and reliability. Since the replacement of the battery in an IMD requires the patient to undergo surgery, batteries for IMDs must have a long service life. Improvements to the reliability, performance, and lifetime of such batteries is therefore highly desirable.

Apart from battery chemistry, the process by which battery electrodes are manufactured is one of the most important factors impacting the quality and performance of the battery. Different fabrication methods have been used to produce electrodes used in battery production. One common method is slurry coating or tape casting, in which a paste including an electrode material and a binder is coated onto a metal foil current collector using a slot die or a doctor blade. Such processes are ordinarily used for battery applications requiring thin electrodes, such as high rate lithium ion batteries. In another method of producing electrodes, the electrode material is mixed with a binder, formed into a sheet, cut to size, and then pressed onto a metal mesh current collector. The binder acts to hold the electrode material together and to help attach it to the current collector. However, the high pressure pressing step creates high stresses in the binder that commonly cause warping of the electrode and delamination of the electrode material from the current collector. Furthermore, the electrode material generally does not bind well to the current collector and needs to permeate through the mesh holes of the current collector to bind to the electrode active material on the other side of the current collector. The failure of this binding contributes to the delamination problem.

Another issue in electrode production lies in the current collector itself. The current collector provides mechanical support to the electrode materials and conducts current from the electrodes to the battery terminals. As the current collector is a non-active component of the battery, it is desirable to reduce the volume of the current collector as much as possible in order to maximize the energy density of the battery. Where the electrode material is not compatible with the material forming the current collector, a conductive coating is often applied to the surface of the current collector to protect it from reacting with the electrode material. Defects in this coating could have a detrimental impact on the long-term performance of the battery.

There therefore is a need for improvements to the methods used to produce battery electrodes in order to address these problems.

SUMMARY OF THE INVENTION

One aspect of the present disclosure provides a method for fabricating a battery electrode. The method includes forming a mixture including an electrode material and a binder; forming an electrode blank from the mixture; heating the electrode blank at a predetermined temperature for a predetermined time to form an annealed electrode blank; and laminating the annealed electrode blank to a current collector.

Another aspect of the present disclosure provides a battery including a housing; and a cell stack disposed in the housing, the cell stack including an anode, a cathode made by the method described above, and a separator electrically insulating the anode from the cathode.

Yet a further aspect of the present disclosure provides another method for fabricating a battery electrode. The method includes forming a mixture including an electrode material and a binder; forming an electrode blank from the mixture; heating a current collector having a conductive coating at a selected temperature for a selected time to form an annealed current collector; and laminating the annealed current collector to the electrode blank.

BRIEF DESCRIPTION OF THE DRAWINGS

Various embodiments of the present battery electrodes and methods for manufacturing same are disclosed herein with reference to the drawings, wherein.

DETAILED DESCRIPTION

The present application describes methods for producing electrode assemblies, and in particular cathode assemblies for use in medium rate batteries. Such batteries typically have a single relatively thick cathode assembly and one or two anode assemblies separated from the cathode assembly by a separator. However, the methods disclosed herein are not limited to medium rate batteries, but may be applied to any batteries having one or more electrodes formed using a pressing operation, including high rate batteries, rechargeable batteries and other types of batteries.

As used herein, the terms "substantially," "generally," and "about" are intended to mean that slight deviations from absolute are included within the scope of the term so modified.

General Battery Design

The battery embodiments described herein may be particularly useful to the operation of IMDs, such as those that employ medium rate batteries. Examples of such devices include pacemakers and implantable cardiac monitors.

Figure 1:
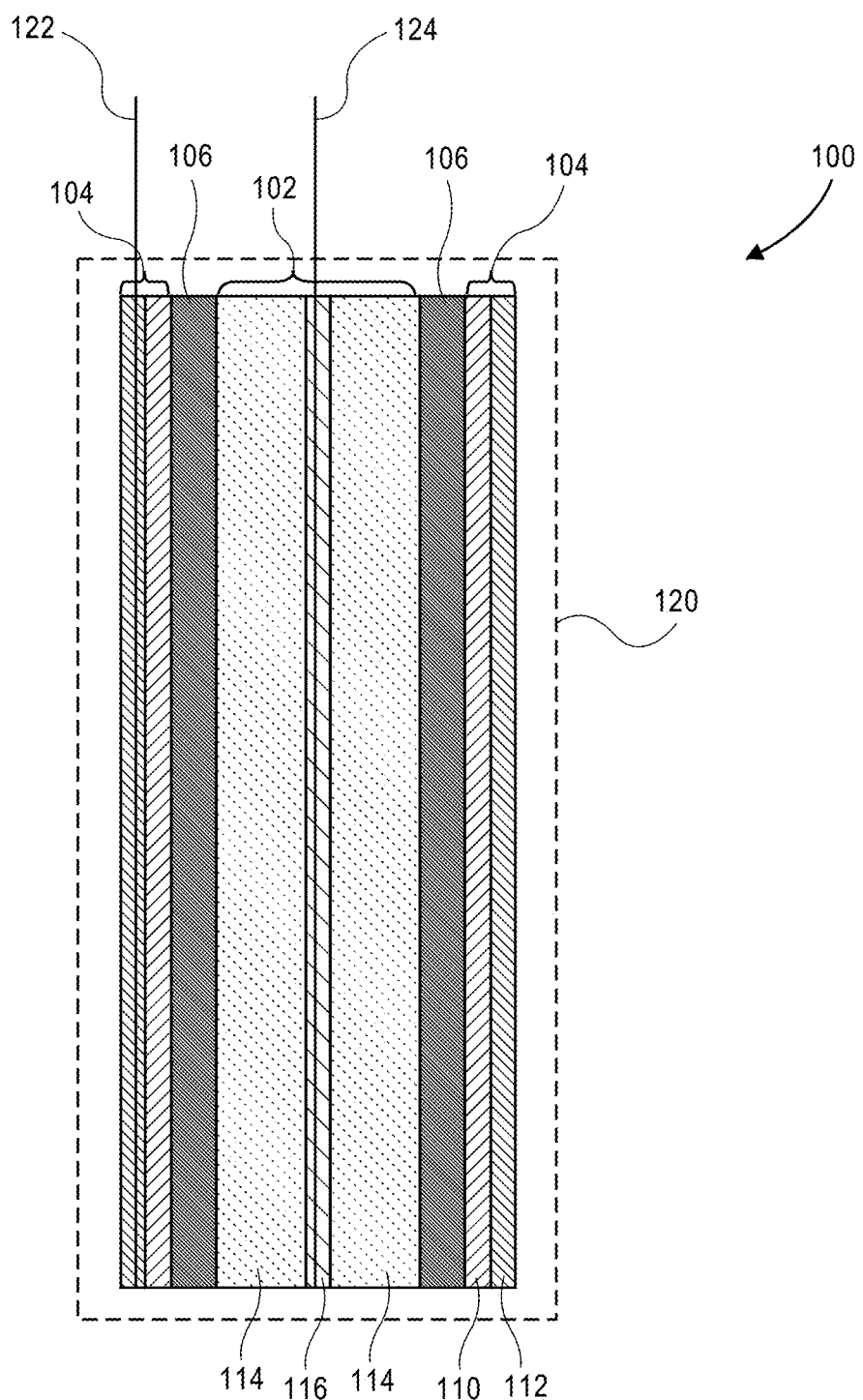
FIG. 1 is a schematic cross-section of a battery according to one embodiment of the disclosure.

IMDs require a power source in order to operate. A primary lithium battery may be used to provide a medium current output power source. FIG. 1 illustrates an exemplary design for a medium rate battery 100. Battery 100 includes a cathode or cathode assembly 102, and a pair of anodes or anode assemblies 104 sandwiching the cathode (although it will be appreciated that battery 200 may include a single anode 104). Each anode 104 is separated from cathode 102 by a separator 106, such as microporous polypropylene or polyethylene (or a combination of both).

Cathode 102 and anodes 104 may each include some active material bonded to a current collector. The active materials take part in the electrochemical reaction to produce the current, while the current collectors are conductive materials that provide a low-resistance path for the current to flow. For example, each anode 104 may include an anode active material 110 bonded to a current collector 112, while cathode 102 may include a cathode active material 114 mixed with other additives and bonded to opposite sides of a current collector 116. The assembly of anodes 104, cathode 102 and separators 106 may be arranged in an insulating housing 120. The current collectors 112 of anodes 104 may be electrically connected together and joined to the negative terminal 122 of battery 100, while the current collector 116 of cathode 102 may be joined to the positive terminal 124 of battery 100.

Although not shown in FIG. 1, housing 120 is filled with an electrolyte to facilitate ion transport between anodes 104 and cathode 102. The electrolyte may be a polymer or a liquid electrolyte as would be understood by one skilled in the art. Examples of the electrolyte systems include lithium bis-trifluoromethanesulfonimide (LiTFSI) in propylene carbonate/dimethoxyethane, lithium hexafluoroarsenate (LiAsF$_6$) in propylene carbonate/dimethoxyethane, lithium hexafluorophosphate (LiPF$_6$) in propylene carbonate/dimethoxyethane, lithium bis(fluorosulfonyl)imide (LiFSI) in propylene carbonate/dimethoxyethane, lithium tetrafluoroborate (LiBF$_4$) in gamma-butyrolactone, or lithium tetrafluoroborate (LiBF$_4$) in gamma-butyrolactone/dimethoxyethane. Other suitable electrolyte systems may be used.

In some embodiments, the solvents used in the electrolyte may be selected from the group consisting of propylene carbonate (PC), dimethoxyethane (DME), ethylmethyl carbonate (EMC), dimethyl carbonate (DMC), diethyl carbonate (DEC), or gamma-butyrolactone (GBL). Other suitable solvents may be used in combination with the electrolyte salts.

In some embodiments, some additives may be added to the electrolyte in combination with the solvents. The additives may be selected from the group consisting of diphenol carbonate (DPC) or dibutyl carbonate (DBC). Other suitable additives may be used.

In one embodiment, the active material 110 of anode 104 may comprise a lithium foil, which may be bonded to current collector 112 consisting of an unperforated foil of metallic nickel. Cathode 102 may consist of a cathode active material 114 bonded to a perforated titanium mesh current collector 116. In some embodiments, the titanium mesh may be coated with a layer of a conductive material to prevent reactions between the titanium mesh and the cathode active material. Particularly useful materials for this purpose include conductive carbon paints, such as DAG EB-012 and DAG EB-815 carbon paints available from Henkel AG & Co. of Dusseldorf, Germany.

Cathode active material 114 may include silver vanadium oxide (SVO), sub-fluorinated carbon fluoride (CF$_x$), a combination of SVO and CF$_x$, or other known cathode active materials. Where SVO and CF$_x$ are used in combination, cathode 102 may include individual layers of CF$_x$ and SVO bonded together, or the CF$_x$ and SVO may be mixed together to form a single homogenous layer. Typically, for CF$_x$, x may be between about 0.6 and about 1.2, and in a particular example may be about 1.1. The CF$_x$ may first be treated with a base, such as ammonium hydroxide, in order to neutralize acidics in the CF$_x$ which can degrade the electrolyte, leading to an overall increase in the resistance of the battery. After treatment, the CF$_x$ material may be rinsed with a solvent, such as ethanol.

Cathode Fabrication

In one embodiment, about 15 wt % SVO is blended with about 85 wt % CF$_x$ to form a mixture. To increase the conductivity of the mixture, an additive may be added. The additive may include, for example, one or more of carbon nanotubes, carbon black, graphene, or metal nanoparticles. For example, between about 1 wt % and about 20 wt % of carbon black with a surface area of around 60 m$^2$/g may be added to the mixture to improve the conductivity of the cathode active material.

In addition to a conductivity aid, the mixture may include a binder to hold the materials together following a pressing step. Suitable binders include polytetrafluoroethylene (PTFE), polyvinylidene difluoride (PVDF), and others. In one embodiment, between about 1 wt % and about 10 wt % of PTFE binder may be added to the mixture.

In a particular embodiment, the SVO, CF$_x$, PTFE binder and carbon black additive may be blended together in an isoparaffin medium to form a slurry. The slurry may include between about 20 wt % and about 60 wt % of the dry ingredients and between about 40 wt % and about 80 wt % of the isoparaffin. The isoparaffin may be IsoPar-G, which is a mineral spirit. The slurry may be dried using a centrifuge and cast into thick sheets. The sheets may then be dried under vacuum and cut into cathode material blanks 114 of a desired size and shape to form cathode 102. The method for forming cathode blanks 114 may include additional and/or different steps, or the blanks may be made by a different method as will be known to those skilled in the art.

Figure 3A:
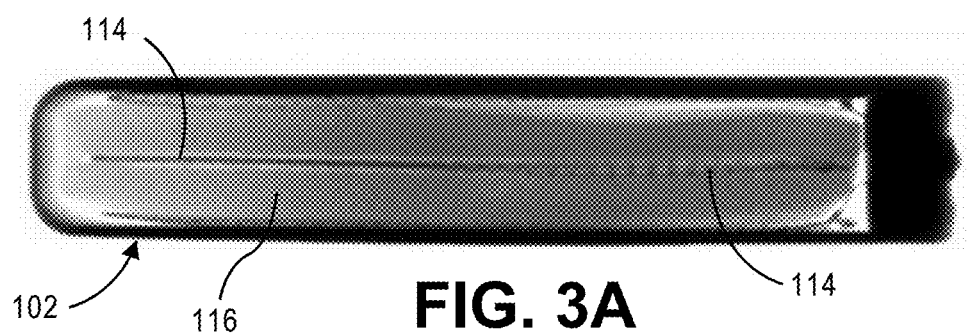
FIG. 3A is a highly schematic side view of a cold pressed cathode assembly.

In a typical cathode lamination process, referred to herein as a cold pressed process, a cathode collector 116 is stacked between two cathode blanks 114 and compressed at room temperature by a hydraulic die press to laminate the layers together to form cathode assembly 102. The lamination of cathode blanks 114 with current collector 116 induces significant stresses within the PTFE binder. In the cold pressed process, these stresses often cause warping of cathode assembly 102 and delamination of cathode material 114 from current collector 116. FIG. 3A is a highly schematic side view showing the warping and delamination in a cathode assembly 102 formed by a cold pressed process.

Several attempts were made to alter the lamination process to avoid the defects resulting from the cold pressed process. In one attempt, referred to herein as the hot pressed process, the die of the hydraulic press was heated to 220° C. such that cathode blanks 114 were heated during the pressing step. Although the resulting cathode assembly 102 was flat and did not exhibit delamination, cathode material 114 stuck to the pressing die and the cathode was hard to demold, especially while the die was hot. In a third lamination process, referred to herein as cold pressed and post-annealed, cathode blanks 114 were laminated to current collector 116 at room temperature as in the cold pressed process, and the resultant cathode assembly was subsequently clamped under pressure and annealed at 280° C. for 30 minutes. This process produced cathode assemblies 102 that are flat and that do not exhibit delamination, but the electrodes stuck to the die during the annealing process.

In a fourth process, referred to herein as the pre-annealed and cold pressed process, cathode blanks 114 were annealed prior to a cold pressing step. In an annealing process, cathode blanks 114 are heated to a predetermined temperature for an appropriate amount of time. The time and temperature of the annealing process will be influenced by several factors, including the thickness of the cathode blank, and the type and amount of binder used. For example, for a PTFE or PVDF binder (or a combination of the two), the annealing process may be conducted at a temperature of between about 100° C. and about 320° C. for between about 5 minutes and about 6 hours. Preferably, the annealing process for these binders may be conducted at a temperature of between about 200° C. and about 300° C. for between about 10 minutes and about 1 hour. In a specific embodiment in which the cathode blank material includes about 2 wt % PTFE binder, the annealing process may be conducted at about 280° C. for about 30 minutes. The annealing process is thought to greatly reduce the stresses that develop in the PTFE binder during the subsequent lamination process.

Figure 2:
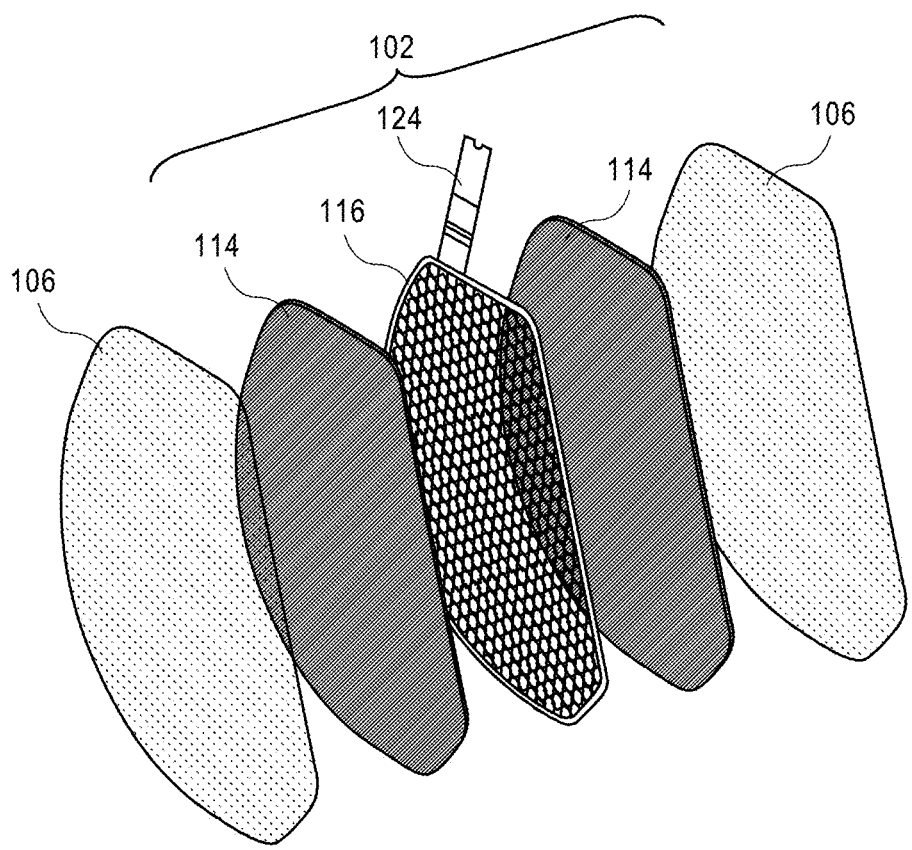
FIG. 2 is an exploded perspective view of a battery cathode assembly.
Figure 3B:
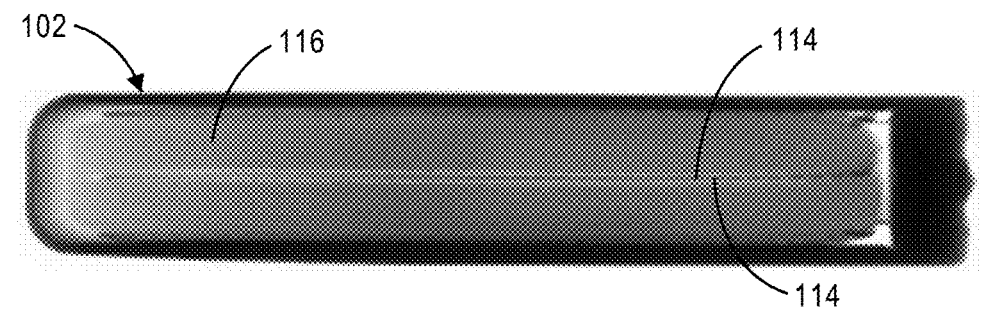
FIG. 3B is a highly schematic side view of a cathode assembly that was annealed prior to pressing.

Following the annealing process, cathode blanks 114 may be cooled to room temperature. A cathode collector 116 may then be stacked between two cathode blanks 114, as shown in FIG. 2, and inserted into a hydraulic die press to laminate the layers together into cathode assembly 102. Cathode blanks 114 and current collector 116 may be laminated together at room temperature and a pressure of between about 5 ksi and about 100 ksi. The pressure in ksi refers to kilopounds per square inch. In one example, a preferred pressure range is about 30 ksi to about 60 ksi, and more preferably about 40 ksi, with an active loading range of between about 71 mg·cm$^{-2}$ and about 73 mg·cm$^{-2}$. As shown in FIG. 3B, cathode assembly 102 resulting from the pre-annealed and cold pressed process is flat and does not exhibit delamination between cathode material 114 and current collector 116.

Following lamination, cathode assembly 102 may be encapsulated by separators 106, shown in FIG. 2. Each cathode assembly 102 may be sealed in a shut-down separator bag or sleeve made of an electrically insulating material to electrically insulate cathode assembly 102 from anodes 104 and housing 120, while still allowing the transport of ions, particularly Li+ ions, therethrough to facilitate the passage of electric current in battery 100. In some embodiments, separators 106 may comprise a micro-porous or nano-porous material with an average pore size between about 0.02 µm and about 0.5 µm. In an exemplary embodiment, the average pore size in separators 106 is about 0.05 µm. Separators 106 (or the shut-down separator bag) may be made, for example, from a material selected from the group consisting of paper, cotton, nylon, polyethylene, polypropylene, polytetrafluoroethylene, ceramics or rubber. Other suitable materials may be used.

Further improvements to cathode 102 may be achieved by processing current collector 116 prior to the lamination step described above. Current collectors 116 are frequently supplied by an outside vendor that manufactures the current collectors and/or coated current collectors using proprietary technology. It has been found that the conductive coating applied to current collectors 116 exhibits microscopic cracks and pin holes. Additionally, the coatings in these current collectors may not be fully cured as received from the supplier, and may include solvent remnants distributed therein. The defects in the coating and any solvent remnants may have a detrimental impact on the long-term performance of battery 100. Since the conductive coatings typically applied to the current collectors include a wax or similar binder to hold the coating together and adhere it to the underlying titanium mesh, subjecting the current collectors to an annealing process prior to their lamination to cathode blanks 114 may drive off any remnant solvents and reflow the coating to fill any cracks and pin holes therein, and thus may improve the long-term performance of battery 100.

The process for annealing current collector 116 is similar to that for annealing cathode blanks 114. That is, in the annealing process, current collector 116 is heated to a selected temperature for an appropriate amount of time. The time and temperature of the annealing process will be influenced by factors such as the amount and type of the wax or other binder in the coating, the coating thickness, and the like. For current collectors 116 having a DAG EB-012 or a DAG EB-815 carbon coating, the annealing process may be conducted at a temperature of between about 120° C. and about 300° C. for between about 5 minutes and about 120 minutes. In a specific embodiment, the annealing process may be conducted at about 280° C. for about 30 minutes. Following annealing, current collector 116 may be laminated between two cathode blanks 114 using the pre-annealed and cold pressed process described above.

Battery 100 may be formed by stacking cathode assembly 102 encapsulated by separators 106 between two anodes 104. Anodes 104 may also be encapsulated by separators (not shown) that may include a shut-down separator bag or sleeve of the type described above. The stacked arrangement may then be assembled within housing 120, and the housing may be filled with an electrolyte, such as lithium tetrafluoroborate (LiBF$_4$) in gamma butyrolactone/dimethoxyethane. The cathode assembly 102 in the stack may include a coated current collector 116 annealed by the process described above, and two cathode blanks 114 laminated to the current collector using the pre-annealed and cold pressed process described above.

Figure 4:
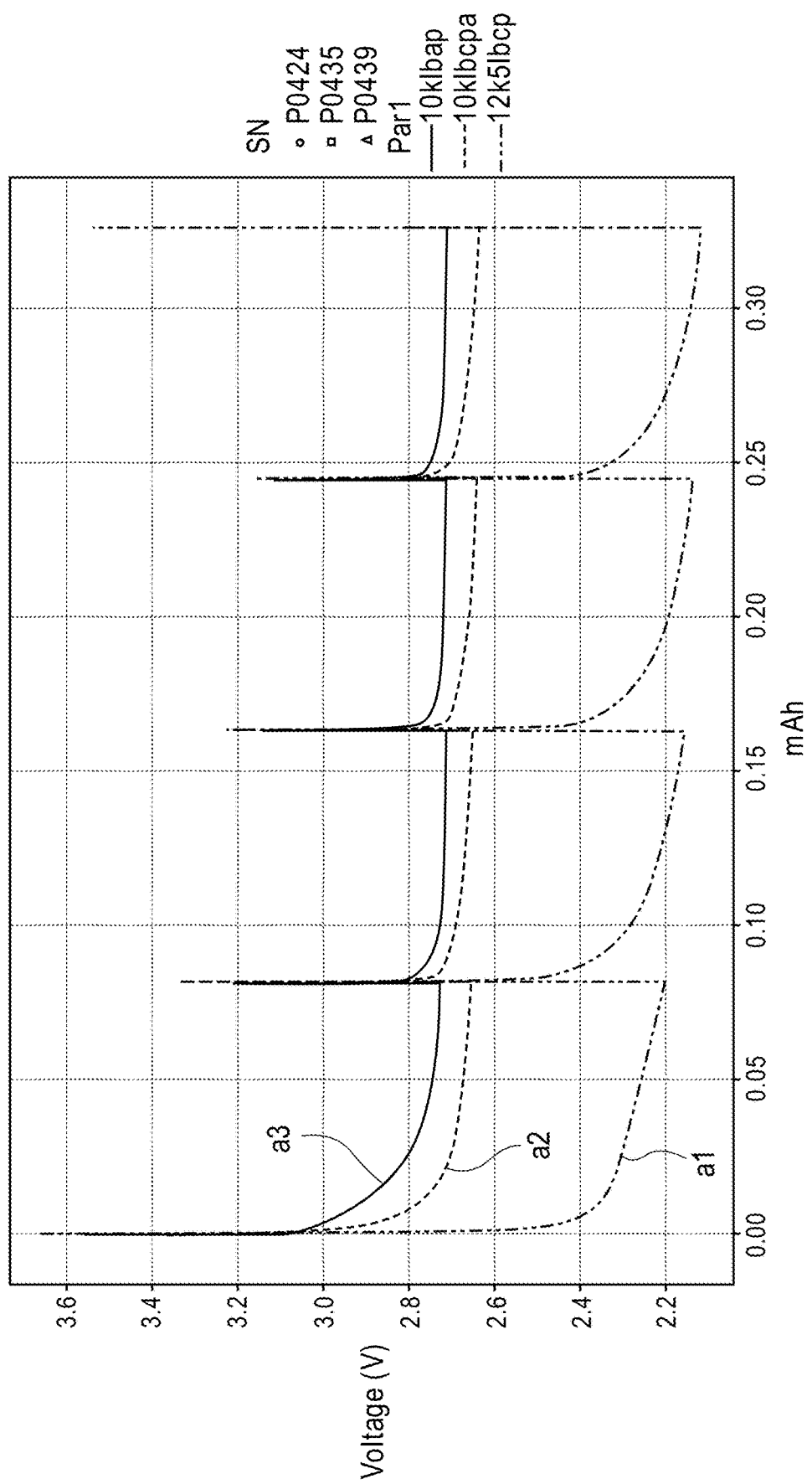
FIG. 4 is a graph illustrating battery acceptance pulse voltages for batteries having cathodes formed by different processes.

Batteries produced by the methods described herein were tested for electrical performance FIG. 4 shows the acceptance pulse (AP) voltage for batteries in which cathode assembly 102 was formed using the different lamination processes described above. In each case, the current collector 116 was as received from the vendor (i.e., not annealed). In FIG. 4, graph a1 reflects the AP voltage for a battery having a cold pressed cathode assembly; graph a2 reflects the AP voltage for a battery having a cold pressed and post-annealed cathode assembly; and graph a3 reflects the AP voltage for a battery having a pre-annealed and cold pressed cathode assembly. As can be seen, the battery having the pre-annealed and cold pressed cathode assembly yielded the highest AP voltage, which corresponds to the best battery performance.

Figure 5:
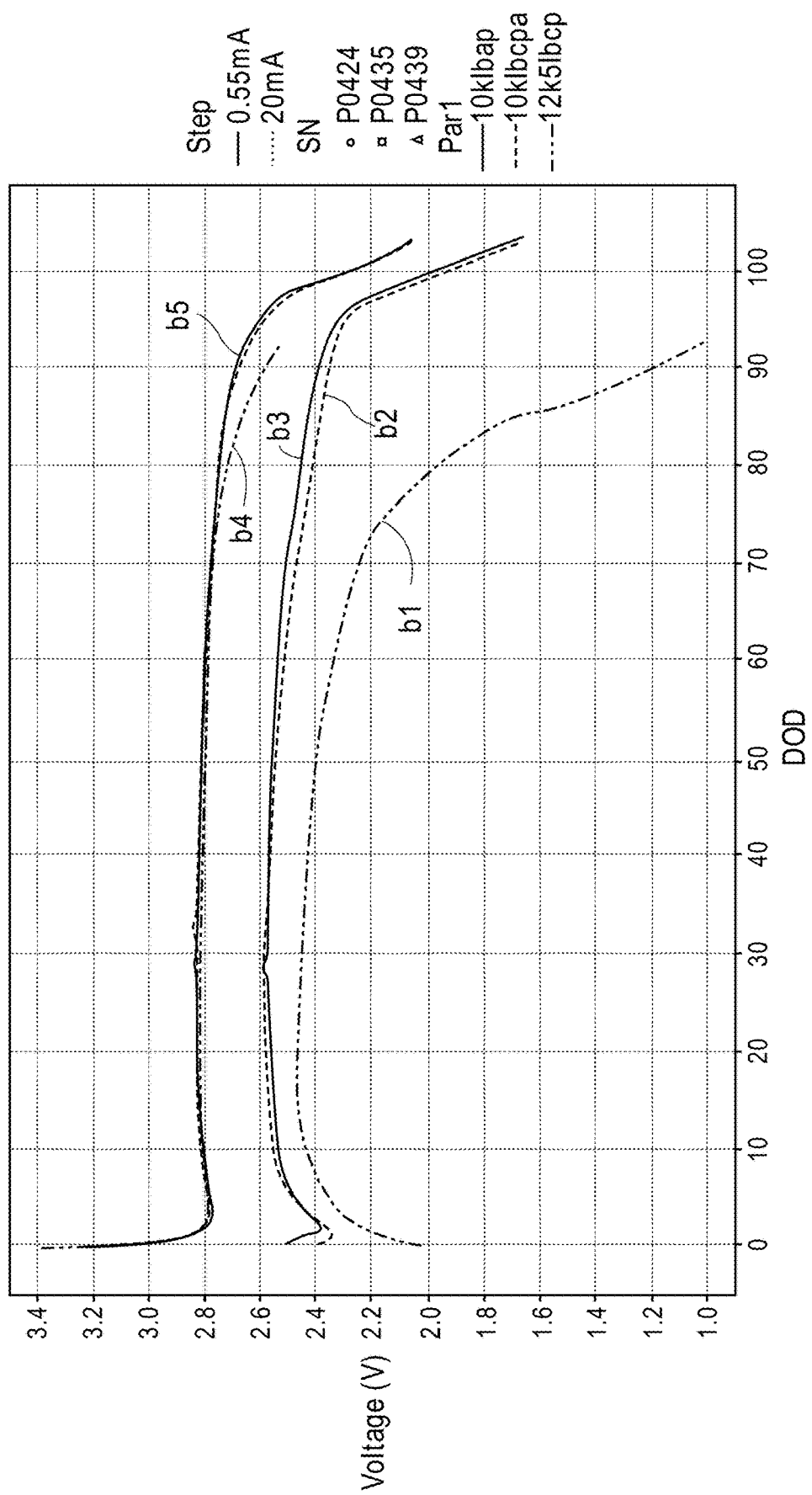
FIG. 5 is a graph illustrating accelerated pulse test results for batteries having cathodes formed by different processes.

FIG. 5 illustrates the accelerated pulse test (APT) voltage for batteries in which cathode assembly 102 was formed using the different lamination processes described above. In each case, the current collector 116 was as received from the vendor (not annealed). In FIG. 5, the x axis depicts the depth of discharge (DOD), which is the percentage of the battery capacity discharged. There are two groups of lines for each battery tested. The dashed lines in the graph depict the voltages at the end of a 20 mA pulse, while the solid lines in the graph depict the background voltage at 0.55 mA load. Graphs b1 and b4 reflect the APT voltages for a battery having a cold pressed cathode assembly; graphs b2 and b5 reflect the APT voltages for a battery having a cold pressed and post-annealed cathode assembly; and graphs b3 and b5 reflect the APT voltages for a battery having a pre-annealed and cold pressed cathode assembly. As reflected in the graphs, the battery having the pre-annealed and cold pressed cathode assembly yielded the highest APT voltage at each percentage of discharge, reflecting the best battery performance.

Figure 6:
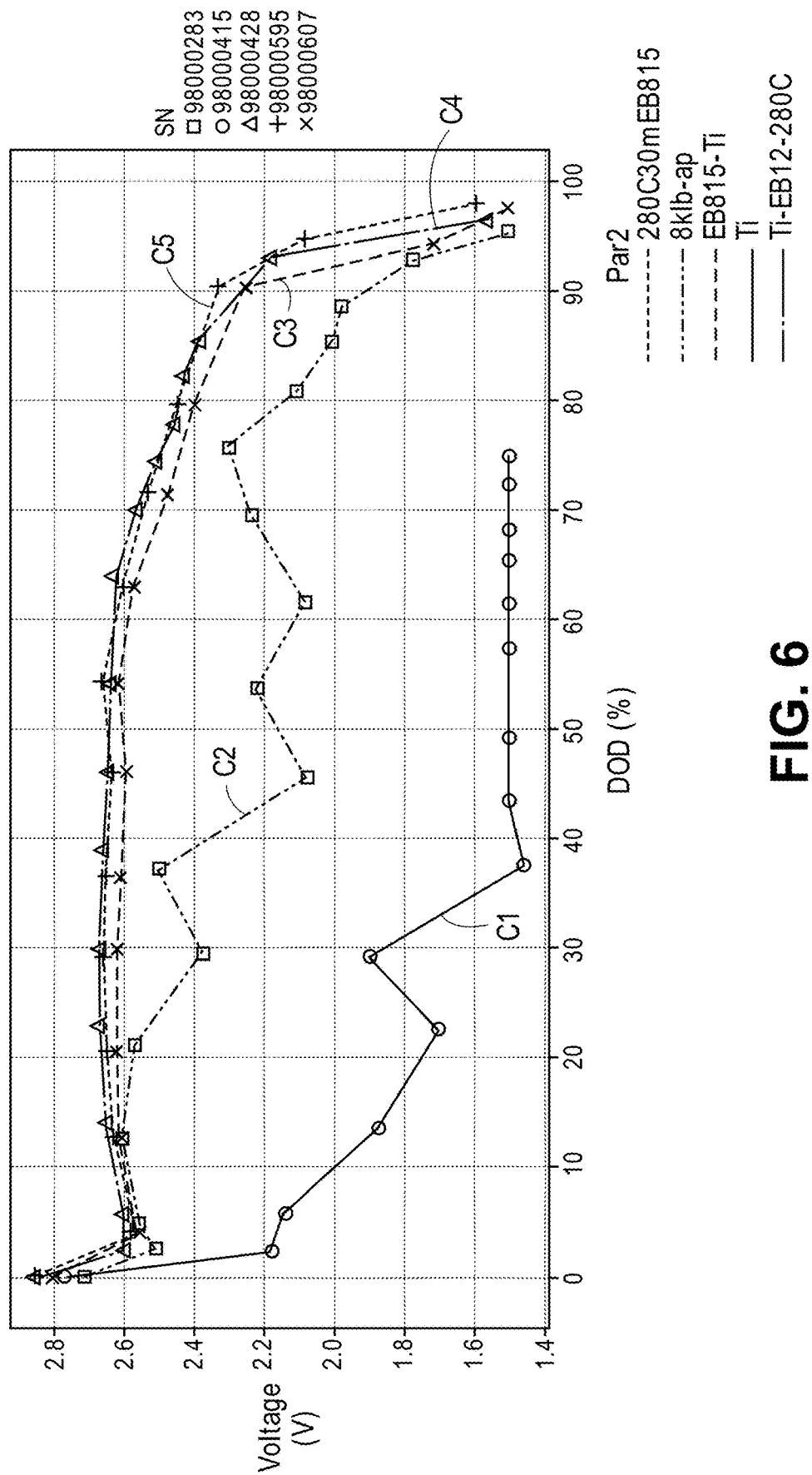
FIG. 6 is a graph illustrating the depth of discharge for batteries having cathodes formed by different processes.

Electrical tests were also performed to determine the performance of a variety of different current collectors, including coated current collectors that were subjected to an annealing process as described above. Batteries having different cathode current collectors were subjected to a 3-month 72° C. accelerated depth of discharge (ADD) life test. The batteries were pulsed using constant current for 15 minutes and the battery voltage was recorded during the pulsing. FIG. 6 shows the voltage at the end of the pulsing, with the x axis depicting the depth of discharge. Graph c1 reflects the voltage for a battery having an uncoated titanium current collector; graph c2 reflects the voltage for a battery having a DAG EB-012 coated titanium current collector as received from the vendor (not annealed); graph c3 reflects the voltage for a battery having a DAG EB-815 coated titanium current collector as received from the vendor (not annealed); graph c4 reflects the voltage for a battery having a DAG EB-012 coated titanium current collector annealed at 280° C. for 30 minutes; and graph c5 reflects the voltage for a battery having a DAG EB-815 coated titanium current collector annealed at 280° C. for 30 minutes. As can be seen from these graphs, the battery with the uncoated titanium current collector died quickly. Both the DAG EB-012 and DAG EB-815 coated current collectors performed better, while the best performance was achieved by the batteries in which the coated current collectors were subjected to an annealing process.

To summarize the foregoing, according to a first aspect of the disclosure, a method for fabricating a battery electrode includes forming a mixture including an electrode material and a binder; forming an electrode blank from the mixture; heating the electrode blank at a predetermined temperature for a predetermined time to form an annealed electrode blank; and laminating the annealed electrode blank to a current collector; and/or the electrode material may include a cathode active material; and/or the cathode active material may include sub-fluorinated carbon fluoride ($CF_x$); and/or the cathode active material may include silver vanadium oxide (SVO); and/or the mixture may include a conductivity enhancer selected from the group consisting of carbon nanotubes, graphene, carbon black, metal nanoparticles, and combinations thereof; and/or the binder may be selected from the group consisting of polyvinylidene, polytetrafluoroethylene, and combinations thereof; and/or the laminating step may include bonding a first electrode blank to a first side of the current collector and bonding a second electrode blank to a second side of the current collector; and/or the method may further include the step of cooling the annealed electrode blank to about room temperature prior to the laminating step; and/or the predetermined temperature may be between about 100° C. and about 320° C.; and/or the predetermined temperature may be between about 200° C. and about 300° C.; and/or the predetermined temperature may be about 280° C.; and/or the predetermined time may be between about 5 minutes and about 6 hours; and/or the predetermined time may be between about 10 minutes and about 1 hour; and/or the predetermined time may be about 30 minutes; and/or the current collector may include a titanium mesh; and/or the current collector may include a conductive carbon coating; and/or the method may further include the step of heating the current collector at a selected temperature for a selected time prior to the laminating step; and/or the selected temperature may be between about 120° C. and about 300° C.; and/or the selected temperature may be about 280° C.; and/or the selected time may be between about 5 minutes and about 120 minutes; and/or the selected time may be about 30 minutes.

According to another aspect of the disclosure, a method for fabricating a battery electrode includes forming a mixture including an electrode material and a binder; forming an electrode blank from the mixture; heating a current collector having a conductive coating at a selected temperature for a selected time to form an annealed current collector; and laminating the annealed current collector to the electrode blank; and/or the laminating step may include laminating a first electrode blank to a first side of the annealed current collector and laminating a second electrode blank to a second side of the annealed current collector; and/or the selected temperature may be between about 120° C. and about 300° C.; and/or the selected temperature may be about 280° C.; and/or the selected time may be between about 5 minutes and about 120 minutes; and/or the selected time may be about 30 minutes.

According to a further aspect of the disclosure, a battery electrode may be made by any of the methods described above.

According to a still further aspect of the disclosure, a battery includes a housing; and a cell stack disposed in the housing, the cell stack including an anode, a cathode made by any of the methods described above, and a separator electrically insulating the anode from the cathode.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for fabricating a battery electrode, the method comprising:
   forming a mixture including an electrode active material and a binder;
   forming an electrode blank from the mixture;
   heating the electrode blank at a predetermined temperature for a predetermined time to form an annealed electrode blank;

cooling the annealed electrode blank to form a cooled electrode blank;

supplying a current collector having a conductive carbon coating;

heating the coated current collector separately from the electrode blank at a selected temperature for a selected time to form an annealed current collector; and laminating the cooled electrode blank to the annealed current collector.

2. The method as claimed in claim 1, wherein the active electrode material includes a cathode active material.

3. The method as claimed in claim 2, wherein the cathode active material includes sub-fluorinated carbon fluoride ($CF_x$).

4. The method as claimed in claim 3, wherein the cathode active material includes silver vanadium oxide (SVO).

5. The method as claimed in claim 1, wherein the mixture includes a conductivity enhancer selected from the group consisting of carbon nanotubes, graphene, carbon black, metal nanoparticles, and combinations thereof.

6. The method as claimed in claim 1, wherein the binder is selected from the group consisting of polyvinylidene difluoride, polytetrafluoroethylene, and combinations thereof.

7. The method as claimed in claim 1, wherein the laminating step includes bonding a first electrode blank to a first side of the current collector and bonding a second electrode blank to a second side of the current collector.

8. The method as claimed in claim 1, wherein the cooling step cools the annealed electrode blank to about room temperature.

9. The method as claimed in claim 1, wherein the predetermined temperature is between about 200° C. and about 300° C.

10. The method as claimed in claim 9, wherein the predetermined temperature is about 280° C.

11. The method as claimed in claim 9, wherein the predetermined time is between about 10 minutes and about 1 hour.

12. The method as claimed in claim 1, wherein the selected temperature is between about 120° C. and about 300° C.

13. The method as claimed in claim 12, wherein the selected time is between about 5 minutes and about 120 minutes.

* * * * *